Oct. 20, 1931.   B. LOEFFLER   1,828,423
CLUTCH BRAKE
Filed Nov. 8, 1929
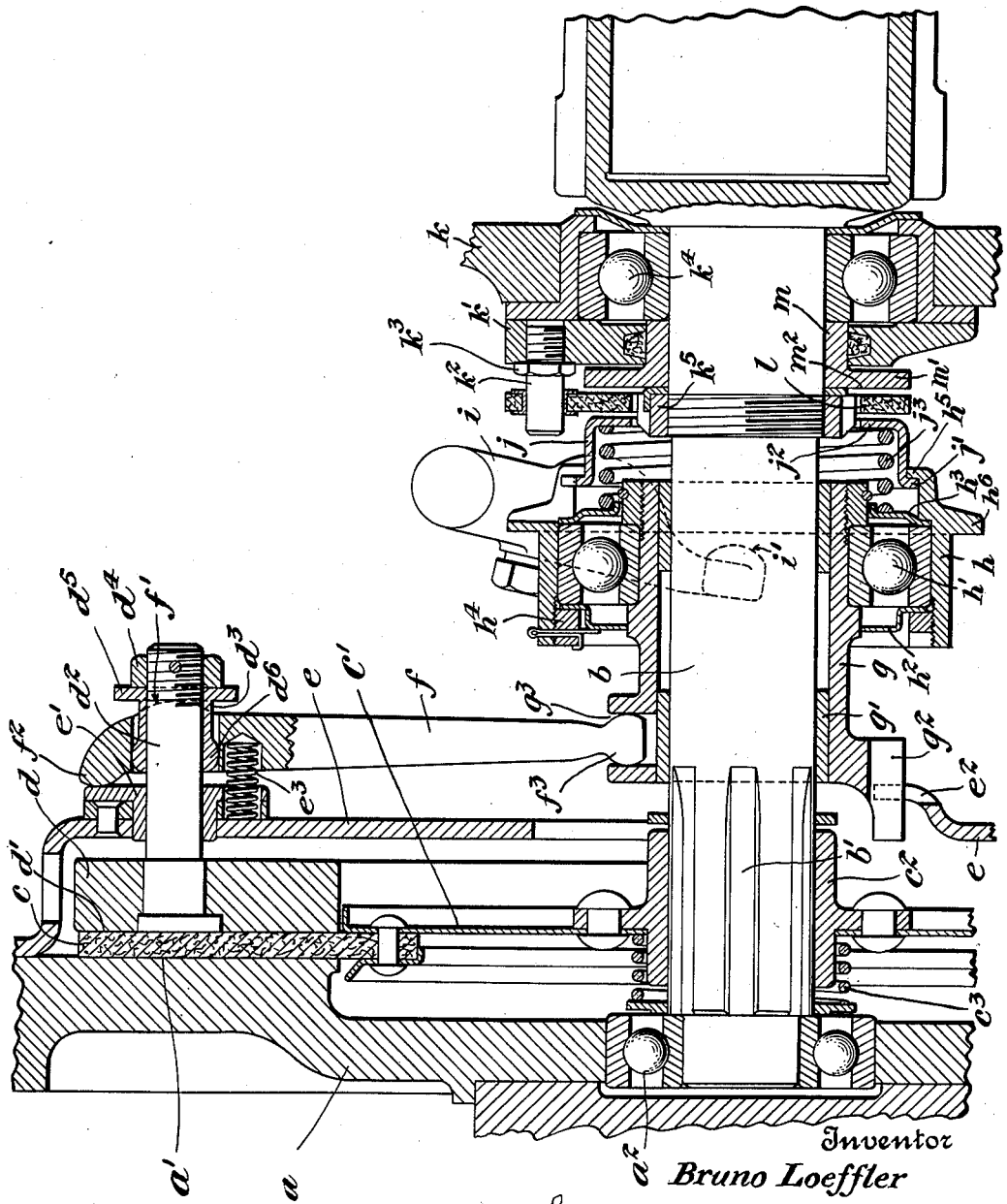
Inventor
*Bruno Loeffler*
By his Attorneys
Redding, Greeley, O'Shea & Campbell

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

CLUTCH BRAKE

Application filed November 8, 1929. Serial No. 405,585.

The present invention relates to clutch mechanisms and embodies, more specifically, an improved clutch in which a brake has been constructed to prevent the rotation of one of the movable elements thereof upon disengagement of the clutch. More particularly, the invention relates to an improved clutch in which the clutch brake is constructed to prevent improper manipulation thereof from injuring the parts of the brake.

It is a matter of common knowledge that great difficulty is experienced in operation with clutch brakes by reason of the fact that the brake pressure varies directly as the force exerted upon the clutch pedal by the operator. Unskilled operators frequently depress the clutch lever so violently that the brake elements, where such are incorporated in the clutch, are severely damaged and quickly rendered inoperative.

An object of the present invention, therefore, is to provide an improved clutch brake mechanism which is so associated with the clutch operating elements that it is automatically applied when the clutch is disengaged.

A further object of the invention is to provide an improved clutch brake construction in which the parts thereof are simple in construction and readily applied to the standard clutch operating mechanism.

A further object of the invention is to provide a clutch brake of the above character in which means is provided for preventing the application of excess braking pressure to the brake.

A further object of the invention is to provide a clutch brake of the above character in which a positive stop is provided to prevent the application of pressure upon the brake elements beyond a predetermined maximum.

Further objects, not specifically enumerated above, will be apparent from the description in connection with the accompanying drawing, wherein the single figure is a view in section, taken through the axis of the clutch, and showing a clutch brake constructed in accordance with the present invention.

With reference to the above figure in the above drawing, $a$ designates a clutch driving member having an engaging face $a'$. A bearing $a^2$ is carried by the driving member and receives one end of a driven shaft $b$ which is splined at $b'$.

A friction disc $c$ is mounted upon a spider $c'$ carried upon a hub $c^2$ which is slidable upon the splines $b'$. Spring $c^3$ normally forces the disc $c$ outwardly away from the face $a'$ to disengage the clutch. A plate $d$, cooperating with the plate $a$ and having an engaging face $d'$ is mounted within a housing member $e$ of the clutch by means of a plurality of pins $d^2$ which are slidably mounted in the housing $e$ by suitable bushings $e'$. Cooperating arms $f$ are pivoted upon a second bushing $d^3$, secured upon the pin $d^2$ by means of a nut $d^4$. The bushing $d^3$ is formed with a flange $d^5$ against which a rounded portion $f'$ on the arm $f$ engages. A toe $f^2$, formed at the extremity of the arm $f$, engages the outer face of bushing $e'$ and serves as a fulcrum for the arm $f$. A spring $e^3$ normally urges the arm outwardly away from the bushing $e'$ and serves to urge plate $d$ away from the friction disc $c$. The bushing $d^3$ is preferably formed with a rounded centering portion $d^6$ and permits pivotal movement of arm $f$ with respect to the pin $d^2$ without lost motion therebetween.

Upon the shaft $b$, a sleeve $g$ is slidably mounted by means of suitable bearing members $g'$. A guide finger $g^2$ is formed on the sleeve to engage a cooperating groove $e^2$, formed in the housing member $e$. This connection prevents rotation of the sleeve $g$ with respect to the housing $e$ but permits axial movement with respect thereto. The inner extremity $f^3$ of arm $f$ is received within a groove $g^3$ on the sleeve $g$ to transmit motion from the sleeve to the arm $f$. Collar $h$ is mounted upon the sleeve $g$ by a suitable bearing $h'$, oil seals $h^2$ and $h^3$ being provided and secured in position by a suitable nut $h^4$. The collar is moved by a suitable yoke member $i$, the operating fingers $i'$ of which engage a peripheral flange $h^6$ on the collar $h$. An inwardly extending peripheral flange $h^5$ is formed on the collar $h$ and carries a cup-shaped member $j$, the cup-shaped member being formed with an outwardly extending peripheral flange $j'$. An inwardly extending flange $j^2$ on the cup-shaped member serves as a bearing face for a clutch brake constructed in the manner described hereinafter. The normal position of the cup-shaped member is that shown in the figure, a spring $j^3$ serving to force the member in such position normally.

Carried with a stationary supporting member $k$ is a plate $k'$ mounting one or more pins $k^2$. The positions of these pins may be adjusted by means of nuts $k^3$ and friction discs $l$ which are slidably mounted upon the pins $k^2$. A collar $m$ is mounted upon the shaft $b$ and formed with a flange $m'$ having an engaging face $m^2$. The collar may be held in position against the bearing $k^4$ by means of a nut $k^5$ which is threaded upon the shaft $b$.

When the flange is disengaged, the fingers $i'$ are moved toward the right, as viewed in the figure, and engage the flange $h^6$ to move the sleeve $g$ and collar $h$ toward the right. This movement causes the flange $j^2$ of the cup-shaped member $j$ to engage the friction disc $l$ and force it against the flange $m'$. Spring $j^3$ causes such engagement to be yielding and thus a braking force is exerted upon the shaft $b$ to stop the rotation thereof after the clutch elements have been disengaged. Further movement of the clutch pedal causes the yoke $i$ to be moved further toward the right and at a predetermined point the cup-shaped member will move away from the flange $h^5$ until it abuts against the seal $h^3$, or until the spring $j^3$ becomes solid. At this time, further movement of the yoke will damage the elements of the brake and such further movement becomes highly undesirable. In order to prevent such movement the pins $k^2$ are so positioned that the yoke $i$ will engage thereagainst to serve as a positive stop to prevent further movement of yoke $i$.

It will be seen that the clutch brake construction is simple in construction and operation and the parts thereof of such character that they may be readily applied to brake operating mechanism of standard forms.

While the invention has been described with specific reference to the accompanying drawing, it is not to be limited, save as defined in the appended claims.

I claim as my invention:

1. In a clutch brake construction, a rotating clutch element, a shaft mounting the same, a braking element on the shaft, a sleeve on the shaft to actuate the clutch, means to move the sleeve axially of the shaft, a retaining flange on the sleeve, a cup shaped braking element, a flange on the cup-shaped braking element engaging the retaining flange, a spring normally urging the flanges together, a stop pin mounted on a relatively stationary element, and a brake disc between the braking elements and carried by the stop pin.

2. In a clutch brake construction, a rotating clutch element, a shaft mounting the same, a braking element on the shaft, a sleeve on the shaft to actuate the clutch, means to move the sleeve axially of the shaft, a retaining flange on the sleeve, a cup shaped braking element, a flange on the cup-shaped braking element engaging the retaining flange, a spring normally urging the flanges together and means to limit the movement of the clutch actuating means.

3. In a clutch brake construction, a rotating clutch element, a shaft mounting the same, a braking element on the shaft, a sleeve on the shaft to actuate the clutch, means to move the sleeve axially of the shaft, a retaining flange on the sleeve, a braking element actuated by the sleeve, means on the last named braking element to engage the retaining flange, a spring normally urging the engaging means against the flange, and means to limit the movement of the clutch actuating means.

4. In a clutch brake construction, a rotating clutch element, a shaft mounting the same, a braking element on the shaft, means on the shaft to operate the clutch, cooperating braking means on the shaft actuated by the clutch operating means, a stop pin mounted upon a relatively stationary element, and a friction disc carried by the stop pin and lying between the cooperating elements.

5. In a clutch brake construction, a rotating clutch element, a shaft mounting the same, means to exert a braking action on the shaft, means to actuate the clutch, means actuated by the last named means to actuate the braking means, a stop carried upon a relatively stationary element to limit the movement of the last named means, and means to adjust the position of the stop with respect to the said last named means.

This specification signed this 4th day of November A. D. 1929.

BRUNO LOEFFLER.